US012091886B2

(12) United States Patent
Lei et al.

(10) Patent No.: US 12,091,886 B2
(45) Date of Patent: Sep. 17, 2024

(54) ELECTRONIC BALL LOCK

(71) Applicant: ZHONGSHAN META INTELLIGENCE CO., LTD., Guangdong (CN)

(72) Inventors: Fei Lei, Guangdong (CN); Jian Chen, Guangdong (CN); Xifeng Wang, Guangdong (CN); Lvcheng Mo, Guangdong (CN); Junquan Lin, Guangdong (CN)

(73) Assignee: ZHONGSHAN META INTELLIGENCE CO., LTD., Guangdong (CN)

( * ) Notice: Subject to any disclaimer, the term of this patent is extended or adjusted under 35 U.S.C. 154(b) by 0 days.

(21) Appl. No.: 17/786,804

(22) PCT Filed: Mar. 29, 2022

(86) PCT No.: PCT/CN2022/083555
§ 371 (c)(1),
(2) Date: Jun. 17, 2022

(87) PCT Pub. No.: WO2023/173476
PCT Pub. Date: Sep. 21, 2023

(65) Prior Publication Data
US 2024/0167298 A1    May 23, 2024

(30) Foreign Application Priority Data
Mar. 14, 2022  (CN) .......................... 202210248026.2

(51) Int. Cl.
*E05B 47/00* (2006.01)
*F16D 28/00* (2006.01)

(52) U.S. Cl.
CPC .......... *E05B 47/0012* (2013.01); *F16D 28/00* (2013.01)

(58) Field of Classification Search
CPC ........ E05B 47/0012; E05B 47/00; E05B 3/00; E05B 15/00; E05B 63/16; F16D 28/00
See application file for complete search history.

(56) References Cited

U.S. PATENT DOCUMENTS

| | | | | |
|---|---|---|---|---|
| 11,814,876 B2 * | 11/2023 | Huang | ................ | E05B 47/068 |
| 2008/0011030 A1 * | 1/2008 | Ferreira Sanchez | ........................ | |
| | | | | E05B 47/0692 |
| | | | | 70/223 |
| 2015/0337571 A1 * | 11/2015 | Henderson | ............... | G07C 9/37 |
| | | | | 292/195 |

FOREIGN PATENT DOCUMENTS

| | | |
|---|---|---|
| CN | 106121379 A | 11/2016 |
| CN | 107143209 A | 9/2017 |

(Continued)

OTHER PUBLICATIONS

International Search Report and Written Opinion in PCT/CN2022/083555 mailed Nov. 30, 2022.

*Primary Examiner* — Kristina R Fulton
*Assistant Examiner* — Thomas L Neubauer
(74) *Attorney, Agent, or Firm* — Whiteford, Taylor & Preston, LLP; Peter J. Davis

(57) ABSTRACT

An electronic ball lock is disclosed, including: a front ball lock body, where the front ball lock body includes a front fixed frame and a front sleeve rotatably arranged on the front fixed frame; a rear ball lock body; a connecting rod having one end connected with the rear ball lock body and the other end provided with a driving member extending into the front fixed frame; an electric clutch mechanism arranged in the front fixed frame and capable of driving the front sleeve to be coupled with or separated from the driving member; and an identification module arranged on the front ball lock body and electrically connected with the electric clutch mechanism.

11 Claims, 6 Drawing Sheets

(56) References Cited

FOREIGN PATENT DOCUMENTS

| | | | |
|---|---|---|---|
| CN | 108798239 | A | 11/2018 |
| CN | 109555361 | A | 4/2019 |
| CN | 213269357 | U | 5/2021 |
| CN | 215212789 | U | 12/2021 |
| EP | 2674553 | A1 | 12/2013 |
| EP | 2927395 | A1 | 10/2015 |

* cited by examiner

ELECTRONIC BALL LOCK

CROSS-REFERENCE TO RELATED APPLICATIONS

This application is a national stage filing under 35 U.S.C. § 371 of international application number PCT/CN2022/083555, filed Mar. 29, 2022, which claims priority to Chinese patent application No. 2022102480262 filed Mar. 14, 2022. The contents of these applications are incorporated herein by reference in their entirety.

TECHNICAL FIELD

The disclosure relates to the technical field of locksets, and more particularly, to an electronic ball lock.

BACKGROUND

A ball lock is favored by users because it is easy to hold, which is convenient for the users to unlock by rotating. The ball locks in the present market are generally unlocked by a key. According to different use requirements, electronic ball locks such as electric switch locks have also appeared in the prior art. The switch lock mechanism and the lock core of such electronic ball lock are both arranged in a sleeve extending along an axial direction of a front ball lock body. Due to a narrow mounting space of the sleeve of the front ball lock body, parts constituting the switch lock mechanism need to be set to a relatively small size, which not only increases difficulty of production and processing, but also easily leads to insufficient strength of the parts, thus affecting operation reliability of the switch lock mechanism, and being very inconvenient to assembly.

SUMMARY

The disclosure aims at solving at least one of the technical problems in the prior art. Therefore, the disclosure provides an electronic ball lock with low production and processing difficulty, convenient assembly and high working reliability.

An electronic ball lock according to the embodiments of the disclosure includes: a front ball lock body, wherein the front ball lock body includes a front fixed frame and a front sleeve rotatably arranged on the front fixed frame; a rear ball lock body; a connecting rod having one end connected with the rear ball lock body and the other end provided with a driving member extending into the front fixed frame; an electric clutch mechanism arranged in the front fixed frame and capable of driving the front sleeve to be coupled with or separated from the driving member; and an identification control module arranged on the front ball lock body and electrically connected with the electric clutch mechanism.

The electronic ball lock according to the embodiments of the disclosure at least has the following beneficial effects.

The electronic ball lock above is provided with the electric clutch mechanism in the front fixed frame of the front ball lock body, and identifies input information and controls an action of the electric clutch mechanism by the identification control module, such that the front sleeve and the driving member can be coupled to realize an unlocking function. Compared with an inner space of the front sleeve, an inner space of the front fixed frame is more regular, which is beneficial for layout of parts, and provides a more convenient mounting space for the electric clutch mechanism, thus reducing difficulty of production and processing, improving assembly efficiency, and improving operation reliability of the electronic ball lock.

In some embodiments of the disclosure, the electric clutch mechanism includes a coupling, a first clutch member and a driving mechanism, the coupling is connected with the front sleeve so as to be rotatable with the front sleeve, the first clutch member is configured to movably penetrate through the coupling or the driving member, and the driving mechanism is capable of driving the first clutch member to move so as to connect the coupling with the driving member. The electric clutch mechanism has simple structure and simple clutch action mode.

In some embodiments of the disclosure, the first clutch member is a movable column penetrating through the coupling, the driving member is provided with a coupling hole for the movable column to plug, the movable column is provided with a first elastic member for driving the movable column to be far away from the coupling hole, and the driving mechanism includes a movable push block and a driver for driving the movable push block to abut against the movable column, so that the movable column is inserted into the coupling hole. The movable column movably penetrates through the coupling and may be close to or far from the coupling hole. Under the action of the driver, the movable column can be inserted into the coupling hole; and under the action of the first elastic member, the movable column can be detached from the coupling hole.

In some embodiments of the disclosure, an end of the driving member is provided with an annulus portion, the coupling is provided with an arc-shaped plate portion capable of rotating tightly against an outer wall surface of the annulus portion, the coupling hole is arranged along a radial direction of the annulus portion, the arc-shaped plate portion is provided with a first through hole penetrating through the arc-shaped plate portion along a radial direction of the arc-shaped plate portion, the movable column is arranged to penetrate through the first through hole, a middle portion of the first through hole is provided with a limiting slot, the movable column is provided with a limiting portion capable of reciprocating along an axial direction of the first through hole in the limiting slot, and two ends of the first elastic member respectively abut against the limiting portion and an inner wall of the limiting slot. The limiting slot is matched with the limiting portion to limit a movement stroke of the movable column and prevent the movable column from separating from the coupling. The first elastic member abuts between the limiting portion and the inner wall of the limiting slot, so that the above structure is more compact, which is conducive to improving a space utilization rate in the front fixed frame and providing more possibilities for the design and layout of the electric clutch mechanism.

In some embodiments of the disclosure, the driver includes a transversely arranged rotating shaft, the movable push block is arranged to be penetrated through by the rotating shaft, a first spring is arranged to penetrate through the rotating shaft, the rotating shaft is provided with a locating pin located between two adjacent turns of the first spring, two ends of the first spring respectively abut against a side wall of the locating pin and the movable push block, the movable push block is provided with a pressing inclined plane capable of abutting against the movable column, and the rotating shaft is connected with a motor which drives the rotating shaft to rotate. The structure of the driver above fully combines characteristics of small thickness of the front fixed frame, and has reasonable design layout. Besides, the parts of the electric clutch mechanism are convenient to produce and process, and the assembly efficiency is high, which is helpful to improve the operation reliability of the electronic ball lock.

In some embodiments of the disclosure, the rear ball lock body includes a rear sleeve, and a power supply connected with the motor and the identification control module is arranged in the rear sleeve. The arrangement of the power supply avoids the problem of wiring difficulty caused by external commercial power, and the arrangement of the power supply in the rear sleeve makes full use of the internal space of the rear ball lock body, without increasing the overall size of the electronic ball lock.

In some embodiments of the disclosure, in order to have both of the functions of electronic unlocking and mechanical unlocking, a telescopic lock core and a second clutch member opposite to a protruding portion of the telescopic lock core are arranged in the front sleeve, the protruding portion of the telescopic lock core is capable of pushing the second clutch member to extend into the driving member, so that the front sleeve is coupled with the driving member, and the second clutch member is connected with a second elastic member which drives the second clutch member to be separated from the driving member.

In some embodiments of the disclosure, an end of the driving member is provided with an annulus portion, the front sleeve is provided with a cylinder portion matched with an inner wall of the annulus portion, the front sleeve is provided with a second through hole penetrating axially through the cylinder portion for the second clutch member to extend out, the driving member is provided with a third through hole penetrating through the annulus portion, and the third through hole is opposite to the second through hole for the second clutch member to be inserted in.

In some embodiments of the disclosure, the identification control module is a fingerprint identification module arranged on a front end surface of the front ball lock body. Even if a key is forgotten, the fingerprint identification module can be used to unlock the electronic ball lock, which is very convenient to use.

In some embodiments of the disclosure, the identification control module includes an access identification device for identifying an access card, and the access identification device is arranged in the front ball lock body and electrically connected with the electric clutch mechanism to control an action of the electric clutch mechanism. When a correct access card is received by the access identification device, the electric clutch mechanism can unlock, so that the access card can be used to unlock and lock the electronic ball lock.

Part of the additional aspects and advantages of the disclosure will be given in part in the following description, and will become apparent in part from the following description, or will be learned through the practice of the disclosure.

BRIEF DESCRIPTION OF DRAWINGS

The above and/or additional aspects and advantages of the disclosure will be more apparent from the following description of the embodiments in conjunction with the accompanying drawings, wherein.

DETAILED DESCRIPTION

Figure 1:
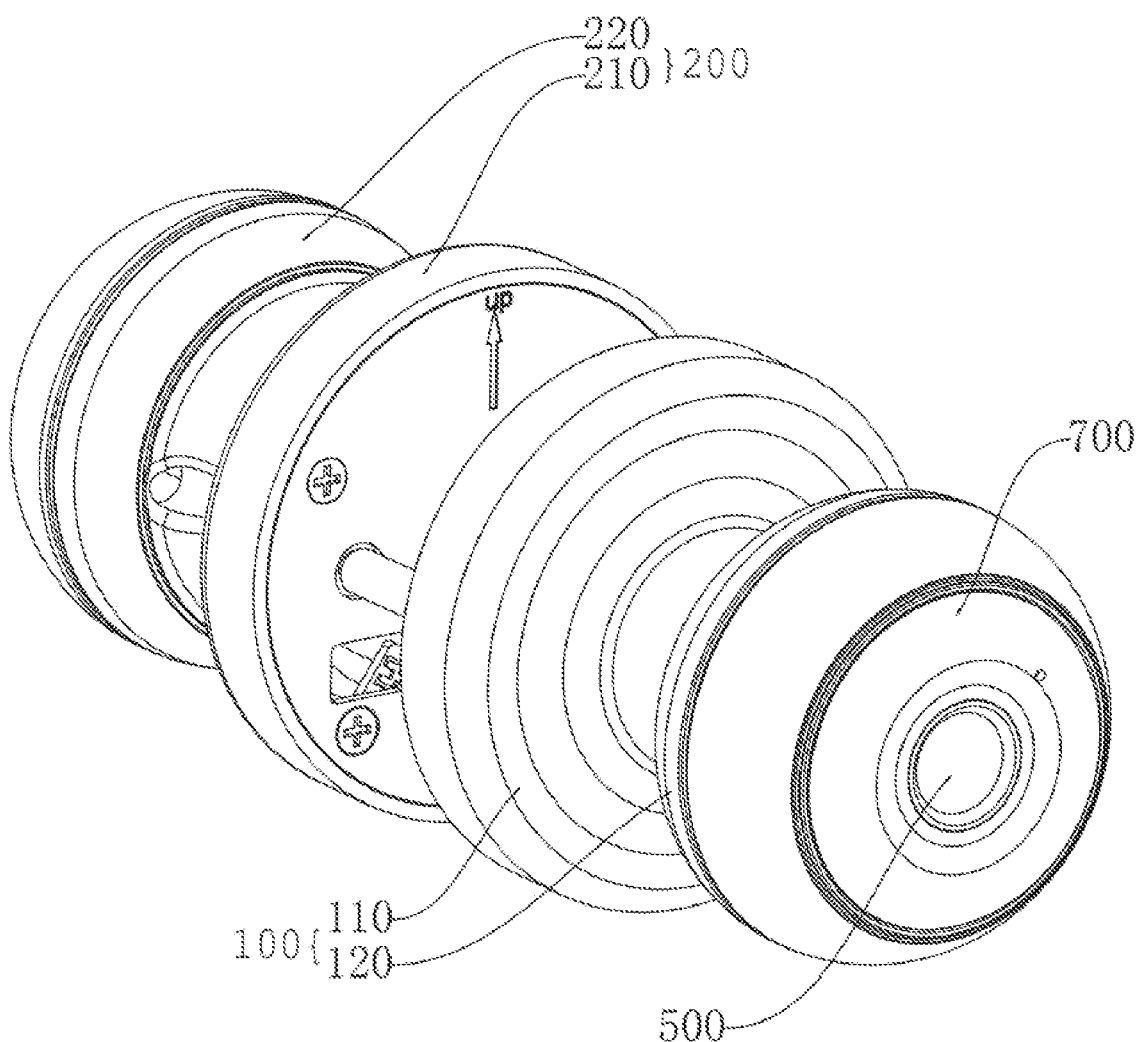
FIG. 1 is a schematic structure diagram of an electronic ball lock according to an embodiment of the disclosure.

Embodiments of the disclosure will be described in detail, the preferred embodiments of the disclosure are shown in the drawings, the drawings are intended to supplement the description in the written portion of the specification with figures, so that people can intuitively and vividly understand each technical feature and the overall technical solution of the disclosure, but it shall not be understood as a limitation to the protection scope of the disclosure.

In the description of the disclosure, the terms first, second, third, fourth, fifth and the like, if mentioned, are used for the purpose of distinguishing the technical features only, and cannot be understood as indicating or implying relative importance, or implicitly indicating the number of technical features indicated thereby, or implicitly indicating the order of technical features indicated thereby.

In the description of the disclosure, it should be understood that the positional descriptions referred to, for example, the directional or positional relationships indicated by up, down, front, rear, left, right, etc., are based on the directional or positional relationships shown in the drawings, and are only for convenience and simplification of description of the disclosure, but not for indicating or implying that the referred device or element must have a specific direction, be constructed and operated in a specific direction, and thus should not be construed as limiting the disclosure.

In the disclosure, the terms "setting", "installation" and "connection" should be understood in a broad sense unless otherwise specified and defined. For example, they may be direct connection, and may also be indirect connection via an intermediate medium; may either be fixed connection or detachable connection, and may also be formed integrally; may be mechanical connection; and may also be the internal communication of two elements or the interaction between two elements. The specific meanings of the above terms in the disclosure may be reasonably determined by those of ordinary skills in the art with reference to the specific contents of the technical solutions.

Referring to FIG. 1 to FIG. 4, an electronic ball lock according to the embodiments of the disclosure includes: a front ball lock body 100, wherein the front ball lock body 100 includes a front fixed frame 110 and a front sleeve 120 rotatably arranged on the front fixed frame 110; a rear ball lock body 200; a connecting rod 300 having one end connected with the rear ball lock body 200 and the other end provided with a driving member 310 extending into the front fixed frame 110; an electric clutch mechanism 400 arranged in the front fixed frame 110 and capable of driving the front sleeve 120 to be coupled with or separated from the driving member 310; and an identification control module 500 arranged on the front ball lock body 100 and electrically connected with the electric clutch mechanism 400.

The electronic ball lock above is provided with the electric clutch mechanism 400 in the front fixed frame 110 of the front ball lock body 100, and identifies input information and controls an action of the electric clutch mechanism 400 by the identification control module 500, such that the front sleeve 120 and the driving member 310 can be coupled to realize an unlocking function. Compared with an inner space of the front sleeve 120, an inner space of the front fixed frame 110 is more regular, which is beneficial for layout of parts, and provides a more convenient mounting space for the electric clutch mechanism 400, thus reducing difficulty of production and processing, improving assembly efficiency, and improving operation reliability of the electronic ball lock.

Figure 3:
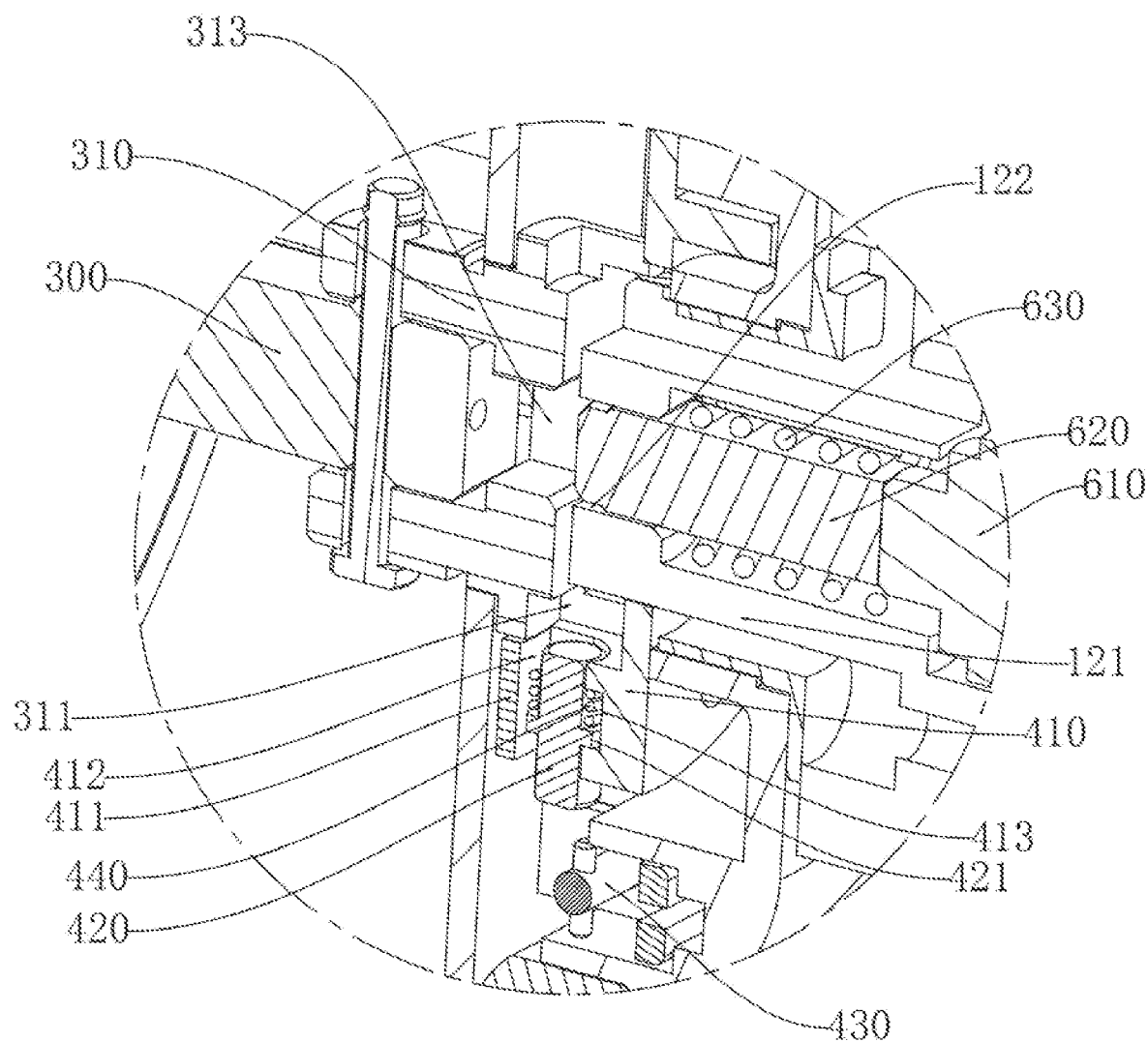
FIG. 3 is a partial enlarged schematic diagram of a portion A in FIG. 2.
Figure 4:
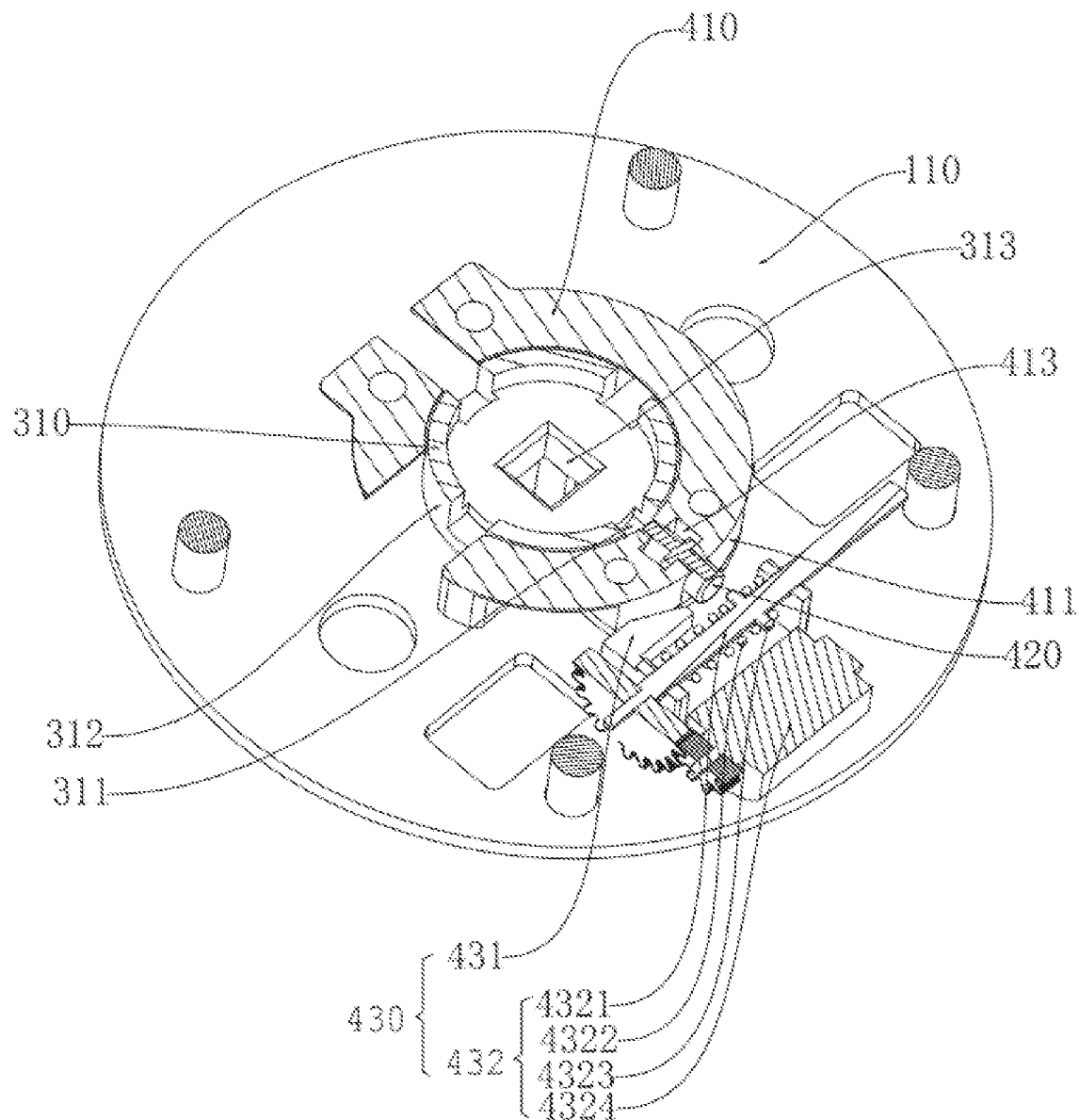
FIG. 4 is a schematic structural diagram of an electric clutch mechanism.

Referring to FIG. 3 and FIG. 4, in some embodiments of the disclosure, the electric clutch mechanism 400 includes a coupling 410, a first clutch member 420 and a driving mechanism 430, the coupling 410 is connected with the front sleeve 120 so as to be rotatable with the front sleeve 120 relative to the front fixed frame 110, the first clutch member 420 is configured to movably penetrate through the coupling 410 or the driving member 310, and the driving mechanism 430 is capable of driving the first clutch member 420 to move so as to connect the coupling 410 with the driving member 310. It may be understood that when a user inputs correct identification information, the identification control module 500 controls the driving mechanism 430 to drive the first clutch member 420 to move to connect the coupling 410 with the driving member 310, so that the user can rotate the front sleeve 120 to realize a door opening action. After the user opens the door, the driving mechanism 430 drives the first clutch member 420 to reset. When the user inputs wrong identification information, the driving mechanism 430 does not work, and the connecting rod 300 cannot be coupled when the user rotates the front sleeve 120, that is, the door cannot be opened. The electric clutch mechanism 400 has simple structure and simple clutch action mode.

Referring to FIG. 3 and FIG. 4, in some embodiments of the disclosure, the first clutch member 420 is a movable column penetrating through the coupling 410, the driving member 310 is provided with a coupling hole 311 for the movable column to plug, the movable column is provided with a first elastic member 440 for driving the movable column to be far away from the coupling hole 311, and the driving mechanism 430 includes a movable push block 431 and a driver 432 for driving the movable push block 431 to abut against the movable column, so that the movable column is inserted into the coupling hole 311. It may be understood that the movable column movably penetrates through the coupling 410 and may be close to or far from the coupling hole 311. Under the action of the driver 432, the movable column can be inserted into the coupling hole 311. Under the action of the first elastic member 440, the movable column can be detached from the coupling hole 311. Certainly, in other embodiments, the combination of the first elastic member 440 and the driver 432 may also be replaced by a linear driving mechanism 430 for driving the movable column to extend and contract towards the coupling hole 311.

Referring to FIG. 3 and FIG. 4, in some embodiments of the disclosure, an end of the driving member 310 is provided with an annulus portion 312, the coupling 410 is provided with an arc-shaped plate portion 411 capable of rotating tightly against an outer wall surface of the annulus portion 312, the coupling hole 311 is arranged along a radial direction of the annulus portion 312, the arc-shaped plate portion 411 is provided with a first through hole 412 penetrating through the arc-shaped plate portion along a radial direction of the arc-shaped plate portion, the movable column is arranged to penetrate through the first through hole 412, a middle portion of the first through hole 412 is provided with a limiting slot 413, the movable column is provided with a limiting portion 421 capable of reciprocating along an axial direction of the first through hole 412 in the limiting slot 413, and two ends of the first elastic member 440 respectively abut against the limiting portion 421 and an inner wall of the limiting slot 413. It should be noted that an axis of the annulus portion 312 and an axis of the arc-shaped plate portion 411 are coaxial, and rotation of the annulus portion 312 relative to the arc-shaped plate portion 411 has the effect of rotating guidance. The limiting slot 413 is matched with the limiting portion 421 to limit a movement stroke of the movable column and prevent the movable column from separating from the coupling 410. The first elastic member 440 abuts between the limiting portion 421 and the inner wall of the limiting slot 413, so that the above structure is more compact, which is conducive to improving space utilization in the front fixed frame 110 and providing more possibilities for the design and layout of the electric clutch mechanism 400.

Referring to FIG. 3 and FIG. 4, in some embodiments of the disclosure, the driver 432 includes a transversely arranged rotating shaft 4321, the movable push block 431 is arranged to be penetrated through by the rotating shaft 4321, a first spring 4322 is arranged to penetrate through the rotating shaft 4321, the rotating shaft 4321 is provided with a locating pin 4323 located between two adjacent turns of the first spring 4322, two ends of the first spring 4322 respectively abut against a side wall of the locating pin 4323 and the movable push block 431, the movable push block 431 is provided with a pressing inclined plane 4311 capable of abutting against the movable column, and the rotating shaft 4321 is connected with a motor 4324 which drives the rotating shaft to rotate. It should be noted that when the motor 4324 drives the rotating shaft 4321 to rotate, the locating pin 4323 on the rotating shaft 4321 can drive the first spring 4322 to move in an axial direction relative to the rotating shaft 4321, thereby driving the movable push block 431 to reciprocate along the axial direction of the rotating shaft 4321, and then driving the movable column to be inserted into the coupling hole 311 by the pressing inclined plane 4311. It is easy to understand that the movement mechanism composed of the rotating shaft 4321, the locating pin 4323 and the first spring 4322 is equivalent to a screw nut mechanism in the mechanical field. During the rotating process of the rotating shaft 4321, the locating pin 4323 is always located between two turns of the first spring 4322, and rotation of the rotating shaft 4321 drives the first spring 4322 to move in the axial direction relative to the rotating shaft 4321. The front fixed frame 110 includes a front mounting plate and a front cover plate arranged on the front mounting plate. The front mounting plate and the front cover plate jointly define an inner space of the front fixed frame 110, and the axis direction of the rotating shaft 4321 is parallel to an inner surface of the front mounting plate. The structure of the driver 432 above fully combines characteristics of small thickness of the front fixed frame 110, and has reasonable design layout. Besides, the parts of the electric clutch mechanism 400 are convenient to produce and process, and the assembly efficiency is high, which is helpful to improve the operation reliability of the electronic ball lock.

Figure 2:
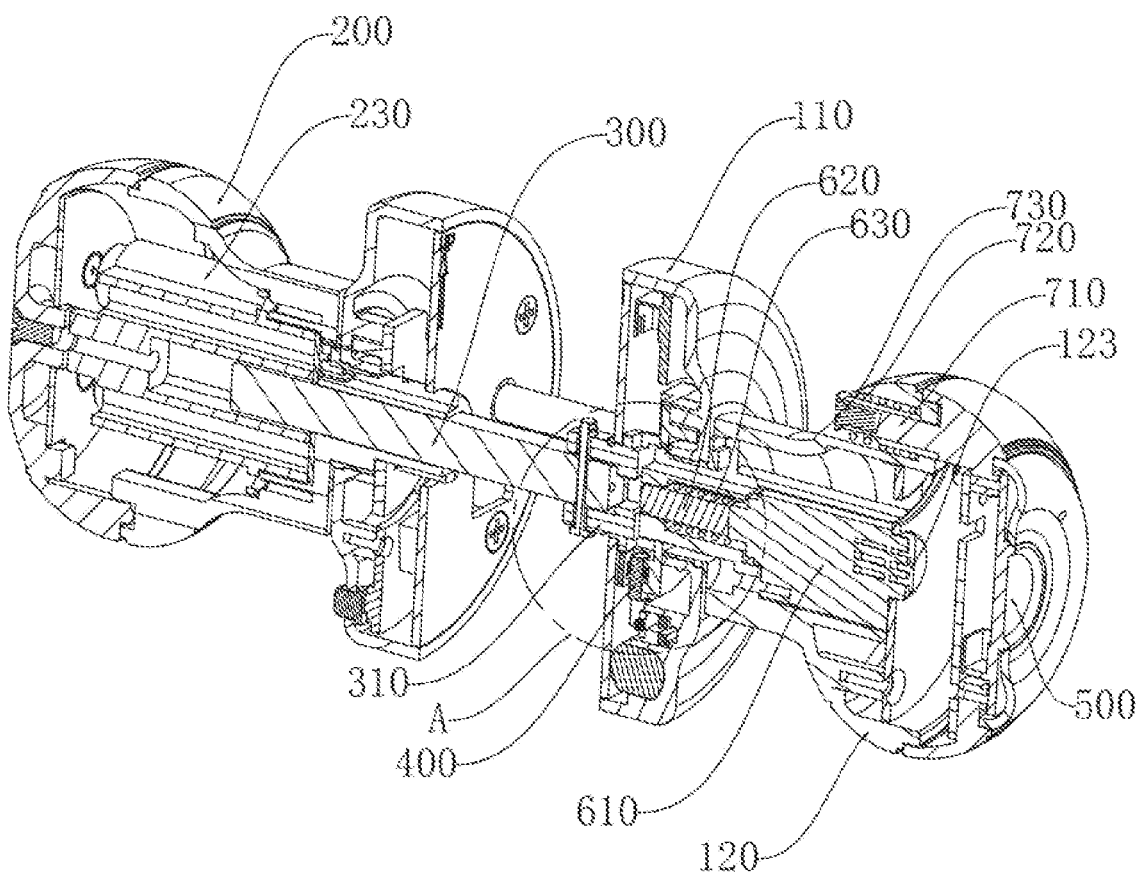
FIG. 2 is a schematic diagram showing an internal cross-section of the embodiment of FIG. 1.

Referring to FIG. 1, FIG. 2 and FIG. 4, in some embodiments of the disclosure, the rear ball lock body 200 includes a rear fixed frame 210 and a rear sleeve 220 rotatably arranged on the rear fixed frame 210, wherein the front fixed frame 110 and the rear fixed frame 210 are respectively installed on both sides of a door plate, and a power supply 230 connected with the motor 4324 and the identification control module 500 is arranged in the rear sleeve 220. The arrangement of the power supply 230 avoids the problem of wiring difficulty caused by external commercial power, and the arrangement of the power supply 230 in the rear sleeve 220 makes full use of the internal space of the rear ball lock body 200, without increasing the overall size of the electronic ball lock.

Referring to FIG. 2 and FIG. 3, in some embodiments of the disclosure, in order to have both of the functions of electronic unlocking and mechanical unlocking, a telescopic lock core 610 and a second clutch member 620 opposite to a protruding portion of the telescopic lock core 610 are arranged in the front sleeve 120, the protruding portion of the telescopic lock core 610 is capable of pushing the second clutch member 620 to extend into the driving member 310, so that the front sleeve 120 is coupled with the driving member 310, and the second clutch member 620 is connected with a second elastic member which drives the second clutch member 630 to be separated from the driving member 310. It should be noted that when the key is inserted into the telescopic lock core 610 and rotated, the protruding portion of the telescopic lock core 610 can be extended to push the second clutch member 620, so as to drive the second clutch member 620 to extend into the driving member 310. At this time, the user can unlock the lock by rotating the front sleeve 120. The telescopic lock core 610 is a conventional technology known to those of ordinary skills in the art, and will not be further described again.

Referring to FIG. 3 and FIG. 4, in some embodiments of the disclosure, an end of the driving member 310 is provided with an annulus portion 312, the front sleeve 120 is provided with a cylinder portion 121 matched with an inner wall of the annulus portion 312, the front sleeve 120 is provided with a second through hole 122 penetrating axially through the cylinder portion 121 for the second clutch member 620 to extend out, the driving member 310 is provided with a third through hole 313 penetrating through the annulus portion 312, and the third through hole 313 is opposite to the second through hole 122 for the second clutch member 620 to be inserted in. It should be noted that, in order to transmit torque, cross section of the second clutch member 620, the second through hole 122 and the third through hole 313 are all in a non-circular shape. In this embodiment, the shape of the second clutch member 620 is a quadrangular prism, and the second through hole 122 and the third through hole 313 are rectangular holes matched with the quadrangular prism.

Figure 5:
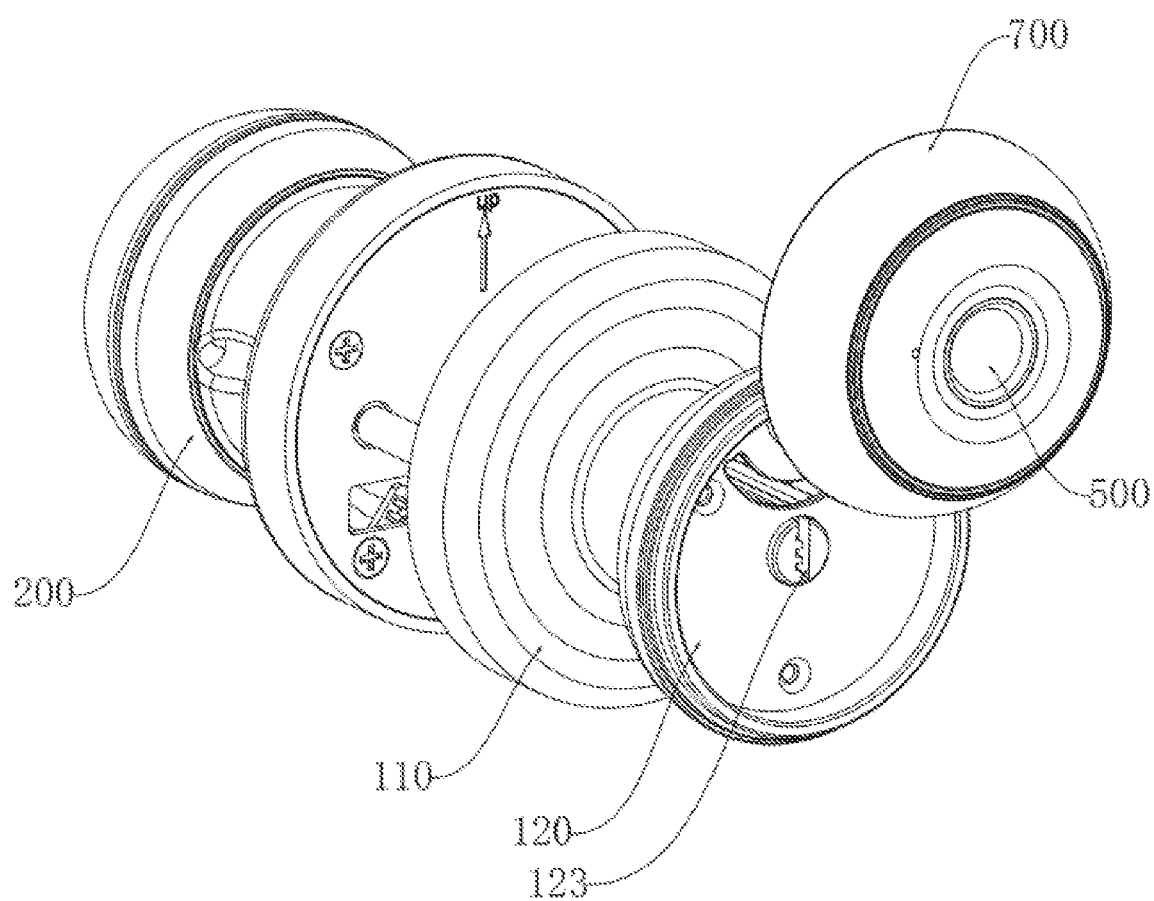
FIG. 5 is a schematic structure diagram of the embodiment of FIG. 1 with a keyhole exposed.
Figure 6:
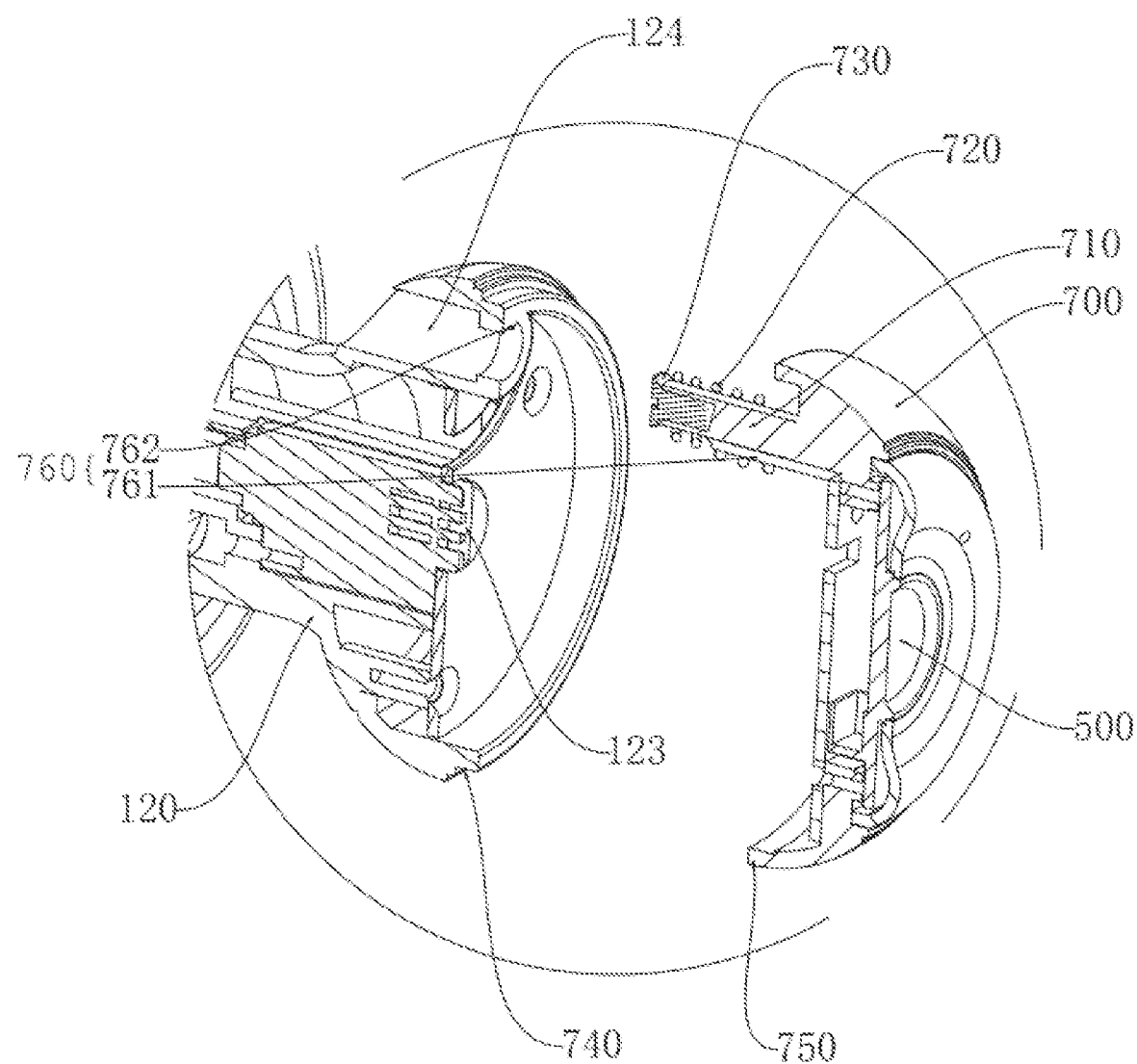
FIG. 6 is a schematic structural diagram of a front ball lock body of FIG. 2 separated from a cover body.

Referring to FIG. 1, FIG. 5 and FIG. 6, in some embodiments of the disclosure, the identification control module 500 is a fingerprint identification module arranged on a front end surface of the front ball lock body 100. Even if the key is forgotten, the fingerprint identification module can be used to unlock the electronic ball lock, which is very convenient to use.

In some embodiments of the disclosure, the identification control module 500 includes an access identification device for identifying an access card, and the access identification device is arranged in the front ball lock body 100 and electrically connected with the electric clutch mechanism 400 to control an action of the electric clutch mechanism 400. When a correct access card is received, the electric clutch mechanism 400 may unlock. Certainly, it may be understood that the identification control module 500 may also be replaced by a password dial or a mobile terminal may be turned on by Bluetooth according to the use requirements.

Referring to FIG. 2, FIG. 5 and FIG. 6, in some embodiments of the disclosure, the front sleeve 120 is provided with a keyhole 123 communicating with the telescopic lock core 610, and the front ball lock body 100 further includes the front sleeve 120. The front sleeve 120 is provided with a cover body 700 that can move relative to the front sleeve to cover or expose the keyhole 123, and the identification control module 500 is arranged on the cover body 700. In the electronic ball lock with the above structure, the cover body 700 moves relative to the front sleeve 120 to cover or expose the keyhole 123. The cover body 700 covering the keyhole 123 can not only avoid dust accumulation in the keyhole 123, but also improve the concealment of the keyhole 123, thus improving the safety of the electronic ball lock. Meanwhile, the identification control module 500 on the cover body 700 is utilized to realize the function of electric unlocking.

Referring to FIG. 5 and FIG. 6, in some embodiments of the disclosure, the keyhole 123 is arranged on a front end surface of the front sleeve 120, and the cover body 700 is rotatably arranged on the front end surface of the front sleeve 120 by a first pivot 710. The first pivot 710 is offset from a rotating axis of the front ball lock body 100. It may be understood that since the first pivot 710 is offset from a rotating axis of the front sleeve 120, when the door needs to be opened with the key, the user can hold the cover body 700 and rotate to expose the keyhole 123 on the front end surface of the front sleeve 120.

In some embodiments of the disclosure, in order to prevent the cover body 700 from moving due to accidental touch to expose the keyhole 123, a limiting mechanism is provided between the front sleeve 120 and the cover body 700 to limit the rotation of the cover body 700 relative to the front sleeve 120.

Referring to FIG. 2 and FIG. 6, in some embodiments of the disclosure, the limiting mechanism includes a third elastic member 720 disposed between the front sleeve 120 and the cover body 700, and the third elastic member 720 is configured for driving the cover body 700 to abut against the front sleeve 120. Under the action of the third elastic member 720, the cover body 700 abuts against the front sleeve 120, and a friction force between the cover body 700 and the front sleeve 120 prevents the cover body 700 from moving relative to the front sleeve 120. Certainly, in other embodiments, the limiting mechanism may also be replaced by a snap-fit structure which is detachably connected between the front sleeve 120 and the cover body 700.

Referring to FIG. 6, in some embodiments of the disclosure, the first pivot 710 is arranged at a side portion of the cover body 700 and parallel to the rotating axis of the front sleeve 120, and the front sleeve 120 is provided with a shaft hole 124 for the first pivot 710 to penetrate through. An end of the first pivot 710 far away from the cover body 700 is detachably connected with an anti-dropping portion 730, and the third elastic member 720 is a second spring arranged to be penetrated through by the first pivot 710, and two ends of the second spring respectively abut against the anti-dropping portion 730 and the front sleeve 120. In this embodiment, the anti-dropping portion 730 is an anti-dropping nut screwed to the end of the first pivot 710, and the arrangement of the third elastic member 720 helps to simplify the structure of the limiting mechanism and reduce the manufacturing cost and the difficulty of production and processing of the electronic ball lock.

Referring to FIG. 5 and FIG. 6, in some embodiments of the disclosure, the limiting mechanism includes an annular recess 740 arranged around the rotating axis of the front sleeve 120 and an annular portion 750 matched with the annular recess 740. One of the annular recess 740 and the annular portion 750 is arranged on the front sleeve 120 and the other is arranged on the cover body 700. In this embodiment, the annular recess 740 is arranged in the front sleeve 120 and the annular portion 750 is arranged in the cover body 700. Because the first pivot 710 is offset from the rotating axis of the front sleeve 120, the cover body 700 cannot directly rotate relative to the front sleeve 120 in a state where the annular recess 740 and the annular portion 750 are engaged with each other. It should be noted that when the cover body 700 needs to be driven to rotate, the user can hold the cover body 700 and then move the cover body 700 away from the front sleeve 120. At this time, the elastic member is compressed, and the first pivot 710 is still located in the shaft hole 124. After the annular portion 750 is separated from the annular recess 740, the cover body 700 can rotate relative to the front sleeve 120, thus exposing or covering the keyhole 123.

Referring to FIG. 6, in some embodiments of the disclosure, an angle limiting structure 760 is provided between the front sleeve 120 and the cover body 700 to limit a rotation angle of the cover body 700. The angle limiting structure 760 can limit the cover body 700 to a preset angle position, and prevent the cover body 700 from excessively rotating when the keyhole 123 needs to be exposed to affect the use convenience.

Referring to FIG. 6, in some embodiments of the disclosure, the angle limiting structure 760 includes a locating protrusion 761 arranged on the side portion of the first pivot 710, the front sleeve 120 is provided with a shaft hole 124 for the first pivot 710 to penetrate through, and an inner wall of the shaft hole 124 is provided with a plurality of stop limiting surfaces 762 which can abut against the locating protrusion 761. When the first pivot 710 rotates clockwise or anticlockwise for a certain angle in the shaft hole 124, the locating protrusion 761 abuts against one of the stop limiting surface of the shaft hole 124, thereby preventing the first pivot 710 from rotating further relative to the shaft hole 124.

In some embodiments of the disclosure, an accommodating space is defined between the cover body 700 and the front sleeve 120, and the identification control module 500 includes a control circuit board arranged in the accommodating space and a fingerprint identification member connected with the control circuit board. It should be noted that both the control circuit board and the fingerprint identification member are arranged on the cover body 700. In a state that the cover body 700 covers the keyhole 123, the control circuit board and the fingerprint identification member can be located in the accommodating space, thus preventing the control circuit board and the fingerprint identification member from being exposed to moisture and suffering electrochemical corrosion.

Referring to FIG. 5 and FIG. 6, in some embodiments of the disclosure, the identification control module 500 is arranged on a front end surface of the cover body 700. It should be noted that when the identification control module 500 is installed on the front end surface of the cover body 700, a palm of the user will not cling to the identification control module 500, thus avoiding unnecessary damage caused by exerting a force on the identification control module 500.

Certainly, the disclosure is not limited to the above embodiments, and those of ordinary skills in the art can also make equivalent modifications or substitutions without violating the gist of the disclosure, and these equivalent modifications and substitutions are all included in the scope defined by the claims of the present application.

The invention claimed is:

1. An electronic ball lock, comprising:
a front ball lock body, wherein the front ball lock body comprises a front fixed frame and a front sleeve rotatably arranged on the front fixed frame;
a rear ball lock body;
a connecting rod having one end connected with the rear ball lock body and the other end provided with a driving member extending into the front fixed frame;
an electric clutch mechanism arranged in the front fixed frame and capable of driving the front sleeve to be coupled with or separated from the driving member; and
an identification control module arranged on the front ball lock body and electrically connected with the electric clutch mechanism;
the electric clutch mechanism comprises a coupling, a first clutch member and a driving mechanism, the coupling is connected with the front sleeve so as to be rotatable with the front sleeve, the first clutch member is configured to movably penetrate through the coupling or the driving member, and the driving mechanism is capable of driving the first clutch member to move so as to connect the coupling with the driving member;
the first clutch member is a movable column penetrating through the coupling, the driving member is provided with a coupling hole for the movable column to plug, the movable column is provided with a first elastic member for driving the movable column to be far away from the coupling hole;
an end of the driving member is provided with an annulus portion, the coupling is provided with an arc-shaped plate portion capable of rotating tightly against an outer wall surface of the annulus portion, the coupling hole is arranged along a radial direction of the annulus portion, the arc-shaped plate portion is provided with a first through hole penetrating through the arc-shaped plate portion along a radial direction of the arc-shaped plate portion, the movable column is arranged to penetrate through the first through hole, a middle portion of the first through hole is provided with a limiting slot, the movable column is provided with a limiting portion capable of reciprocating along an axial direction of the first through hole in the limiting slot, and two ends of the first elastic member respectively abut against the limiting portion and an inner wall of the limiting slot.

2. The electronic ball lock according to claim 1, wherein:
the identification control module is a fingerprint identification module arranged on a front end surface of the front ball lock body.

3. The electronic ball lock according to claim 1, wherein:
the identification control module comprises an access identification device for identifying an access card, and the access identification device is arranged in the front ball lock body and electrically connected with the electric clutch mechanism to control an action of the electric clutch mechanism.

4. The electronic ball lock according to claim 1, wherein:
the driving mechanism comprises a movable push block and a driver for driving the movable push block to abut against the movable column, so that the movable column is inserted into the coupling hole.

5. An electronic ball lock, comprising:
a front ball lock body, wherein the front ball lock body comprises a front fixed frame and a front sleeve rotatably arranged on the front fixed frame;
a rear ball lock body;
a connecting rod having one end connected with the rear ball lock body and the other end provided with a driving member extending into the front fixed frame;

an electric clutch mechanism arranged in the front fixed frame and capable of driving the front sleeve to be coupled with or separated from the driving member; and an identification control module arranged on the front ball lock body and electrically connected with the electric clutch mechanism;

the electric clutch mechanism comprises a coupling, a first clutch member and a driving mechanism, the coupling is connected with the front sleeve so as to be rotatable with the front sleeve, the first clutch member is configured to movably penetrate through the coupling or the driving member, and the driving mechanism is capable of driving the first clutch member to move so as to connect the coupling with the driving member;

the first clutch member is a movable column penetrating through the coupling, the driving member is provided with a coupling hole for the movable column to plug, the movable column is provided with a first elastic member for driving the movable column to be far away from the coupling hole, and the driving mechanism comprises a movable push block and a driver for driving the movable push block to abut against the movable column, so that the movable column is inserted into the coupling hole;

the driver comprises a transversely arranged rotating shaft, the movable push block is arranged to be penetrated through by the rotating shaft, a first spring is arranged to penetrate through the rotating shaft, the rotating shaft is provided with a locating pin located between two adjacent turns of the first spring, two ends of the first spring respectively abut against a side wall of the locating pin and the movable push block, the movable push block is provided with a pressing inclined plane capable of abutting against the movable column, and the rotating shaft is connected with a motor which drives the rotating shaft to rotate.

6. The electronic ball lock according to claim 5, wherein: the rear ball lock body comprises a rear sleeve, and a power supply connected with the motor and the identification control module is arranged in the rear sleeve.

7. The electronic ball lock according to claim 5, wherein: the identification control module is a fingerprint identification module arranged on a front end surface of the front ball lock body.

8. The electronic ball lock according to claim 5, wherein: the identification control module comprises an access identification device for identifying an access card, and the access identification device is arranged in the front ball lock body and electrically connected with the electric clutch mechanism to control an action of the electric clutch mechanism.

9. An electronic ball lock, comprising:

a front ball lock body, wherein the front ball lock body comprises a front fixed frame and a front sleeve rotatably arranged on the front fixed frame;

a rear ball lock body;

a connecting rod having one end connected with the rear ball lock body and the other end provided with a driving member extending into the front fixed frame;

an electric clutch mechanism arranged in the front fixed frame and capable of driving the front sleeve to be coupled with or separated from the driving member; and an identification control module arranged on the front ball lock body and electrically connected with the electric clutch mechanism;

a telescopic lock core and a second clutch member opposite to a protruding portion of the telescopic lock core are arranged in the front sleeve, the protruding portion of the telescopic lock core is capable of pushing the second clutch member to extend into the driving member, so that the front sleeve is coupled with the driving member, and the second clutch member is connected with a second elastic member which drives the second clutch member to be separated from the driving member;

an end of the driving member is provided with an annulus portion, the front sleeve is provided with a cylinder portion matched with an inner wall of the annulus portion, the front sleeve is provided with a second through hole penetrating axially through the cylinder portion for the second clutch member to extend out, the driving member is provided with a third through hole penetrating axially through the annulus portion, and the third through hole is opposite to the second through hole for the second clutch member to be inserted in.

10. The electronic ball lock according to claim 9, wherein: the identification control module is a fingerprint identification module arranged on a front end surface of the front ball lock body.

11. The electronic ball lock according to claim 9, wherein: the identification control module comprises an access identification device for identifying an access card, and the access identification device is arranged in the front ball lock body and electrically connected with the electric clutch mechanism to control an action of the electric clutch mechanism.

* * * * *